United States Patent
Loh

(10) Patent No.: US 8,116,815 B2
(45) Date of Patent: Feb. 14, 2012

(54) SYSTEMS AND METHODS FOR MAINTAINING BASE STATIONS IN WIRELESS NETWORKS

(75) Inventor: Kai Siang Loh, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 792 days.

(21) Appl. No.: 12/195,428

(22) Filed: Aug. 21, 2008

(65) Prior Publication Data

US 2009/0117852 A1 May 7, 2009

Related U.S. Application Data

(60) Provisional application No. 60/985,305, filed on Nov. 5, 2007.

(51) Int. Cl.
*H04B 1/38* (2006.01)
*H04M 1/00* (2006.01)

(52) U.S. Cl. ..... 455/561; 455/436; 455/442; 455/67.11; 455/63.1; 455/450; 370/331; 370/335; 370/342; 370/318

(58) Field of Classification Search ............. 455/561, 455/442, 436–437, 450, 452.1, 452.2, 13.4, 455/562.1, 63.1, 67.11; 370/318, 331; 375/133
See application file for complete search history.

(56) References Cited

U.S. PATENT DOCUMENTS

| | | | | |
|---|---|---|---|---|
| 6,658,252 B2 * | 12/2003 | Mohebbi | | 455/437 |
| 6,754,496 B2 * | 6/2004 | Mohebbi et al. | | 455/436 |
| 6,807,426 B2 * | 10/2004 | Pankaj | | 455/453 |
| 6,889,046 B2 * | 5/2005 | Mohebbi | | 455/437 |
| 6,925,303 B2 * | 8/2005 | Mohebbi et al. | | 455/442 |
| 7,177,644 B2 | 2/2007 | Smith et al. | | |
| 7,274,934 B2 * | 9/2007 | Arazi et al. | | 455/436 |
| 7,502,615 B2 * | 3/2009 | Wilhoite et al. | | 455/442 |
| 7,526,313 B2 * | 4/2009 | Mousseau et al. | | 455/552.1 |
| 7,539,175 B2 * | 5/2009 | White et al. | | 370/350 |
| 7,643,830 B2 * | 1/2010 | Catovic et al. | | 455/436 |
| 7,809,381 B2 * | 10/2010 | Aborn et al. | | 455/456.5 |
| 7,890,130 B2 * | 2/2011 | Sung et al. | | 455/522 |
| 7,912,033 B2 * | 3/2011 | Heidari-Bateni et al. | | 370/350 |
| 2006/0077946 A1 | 4/2006 | Adya et al. | | |
| 2007/0054618 A1 | 3/2007 | Lewis et al. | | |

* cited by examiner

*Primary Examiner* — Marceau Milord

(57) ABSTRACT

Systems and methods for maintaining base stations are provided. In this regard, a representative system, among others, includes a base station that is electrically connected to a first power source. The base station is configured to receive electric power from the first power source. The base station includes a wireless transmitter and a distress module that is configured to determine whether the base station lost the electrical connection to the first power source. The distress module is further configured to instruct the wireless transmitter to transmit a distress signal that includes information associated with the status of the base station responsive to determining that the electrical connection was lost between the first power source and the base station.

20 Claims, 4 Drawing Sheets

SYSTEMS AND METHODS FOR MAINTAINING BASE STATIONS IN WIRELESS NETWORKS

CROSS-REFERENCE TO RELATED APPLICATIONS

This Utility patent application is based on and claims the benefit of U.S. Provisional Application No. 60/985,305, filed on Nov. 5, 2007, the contents of which are hereby incorporated by reference in their entirety.

TECHNICAL FIELD

The present disclosure relates to base stations, and more particularly, the disclosure relates to systems and methods for maintaining wireless base stations.

BACKGROUND

When a wireless base station loses connection to a power source, such as, a power over Ethernet (POE) switch or an outlet, the base station typically loses power and shuts down. The lost connection can be caused by a damaged or unplugged cable from the base station to the power source. The base station essentially is now invisible to the network, and the network administrator typically has difficulties locating the base station to fix the device.

SUMMARY

Systems and methods for maintaining base stations are provided. In this regard, a representative system, among others, includes a base station that is electrically connected to a first power source. The base station is configured to receive electric power from the first power source. The base station includes a wireless transmitter and a distress module that is configured to determine whether the base station lost the electrical connection to the first power source. The distress module is further configured to instruct the wireless transmitter to transmit a distress signal that includes information associated with the status of the base station responsive to determining that the electrical connection was lost between the first power source and the base station.

A representative method, among others, for maintaining a base station comprises the following steps: receiving electric power from a first power source by a base station via an electrical connection; determining whether the electrical connection was lost between the first power source and the base station; and responsive to determining that the electrical connection was lost between the first power source and the base station, wirelessly transmitting a distress signal that includes information associated with the status of the base station.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which base stations are maintained.

Figure 1:
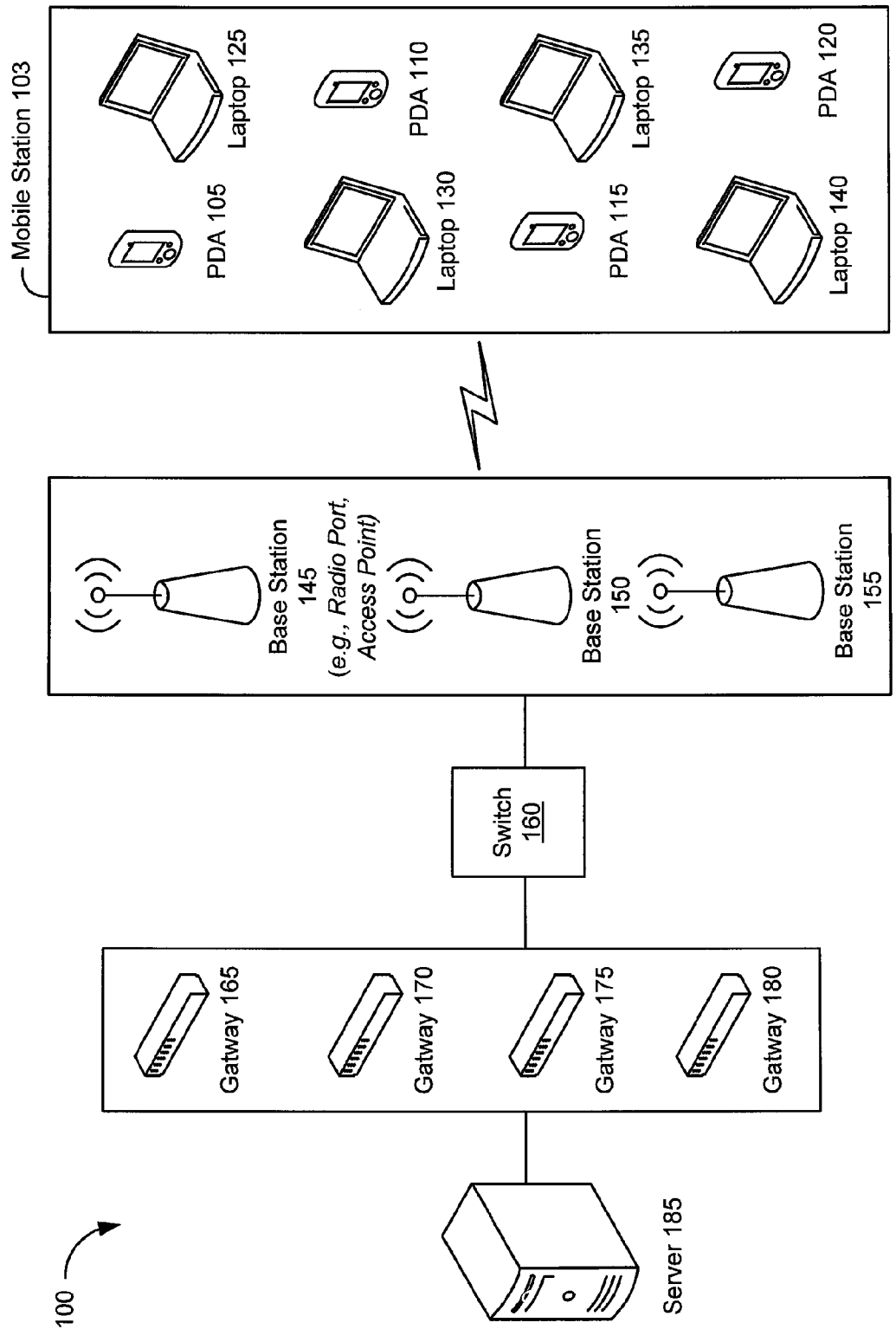
FIG. 1 is a block diagram that illustrates an embodiment of a network infrastructure that includes base stations.

FIG. 1 is a block diagram that illustrates an embodiment of a network infrastructure that includes base stations. The network infrastructure 100 includes mobile stations 103, such as, personal digital assistants (PDAs) 105, 110, 115, 120 and laptops 125, 130, 135, 140, among others. The mobile station 103 can communicate wirelessly with base stations 145, 150, 155, which include, for example, radio ports and access points, among others. The base stations 145, 150, 155 are electrically coupled to a switch 160, which in turn is electrically coupled to gateways 165, 170, 175, 180. A server 185 is electrically coupled to the gateways 165, 170, 175, 180. The base station 145, 150, 155 is described further in relation to FIG. 2. Operations for maintaining the base stations are described in relation to FIGS. 3 and 4.

Figure 2:
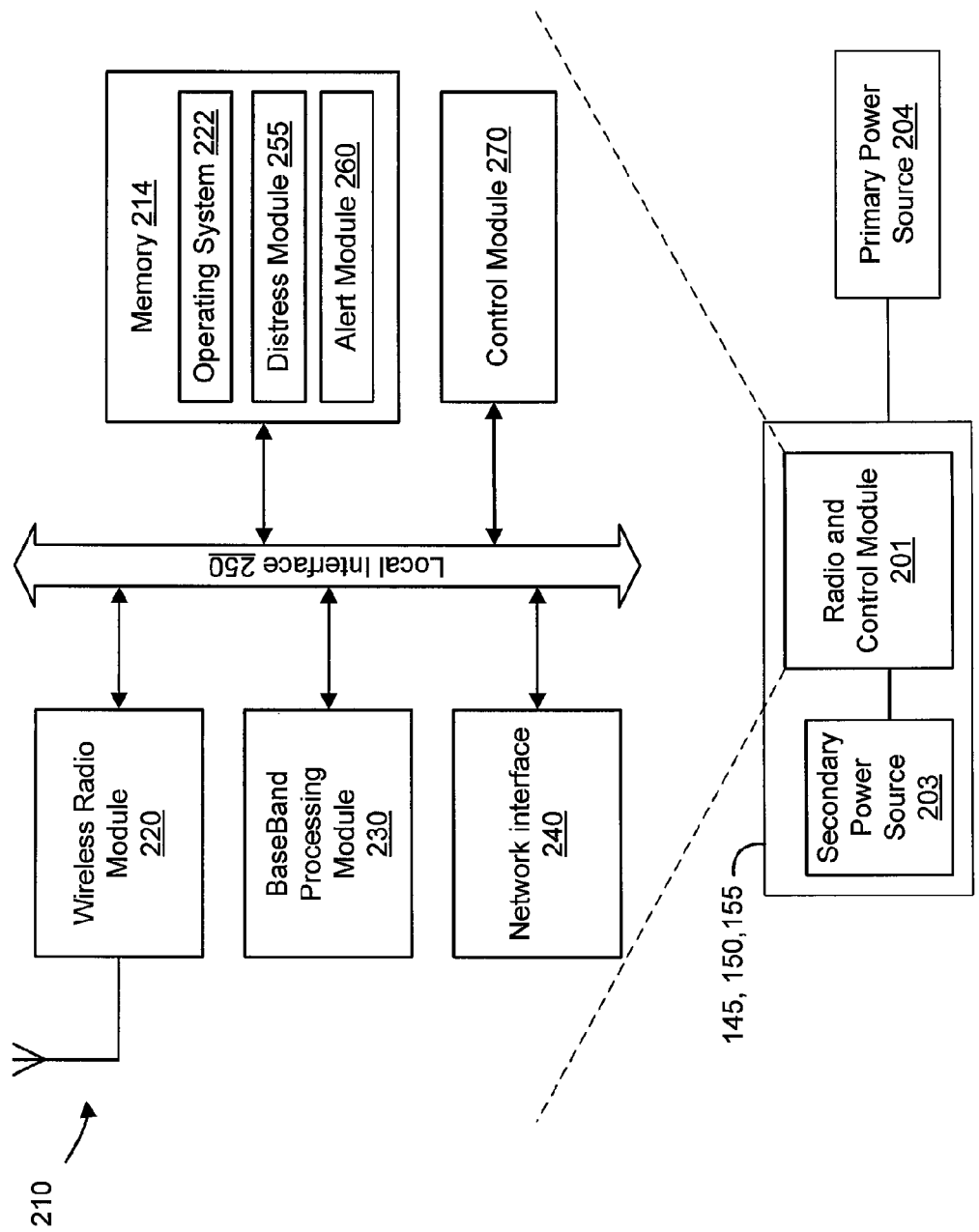
FIG. 2 is a block diagram that illustrates an embodiment of the base stations, such as that shown in FIG. 1.

FIG. 2 is a block diagram that illustrates an embodiment of the base station, such as that shown in FIG. 1. The base station 145, 150, 155 includes a radio and control module 201 which is electrically coupled to a secondary power source 203, such as, a back-up battery. The base station 145, 150, 155 is generally powered by a primary power source 204, such as, a switch 160 and an outlet (not shown), among others.

The radio and control module 201 includes, but is not limited to, a wireless radio module 220 that is electrically coupled an antenna 210, a baseband processing module 230, a network interface 240, memory 214, and a control module 270, all of which are electrically coupled to a local interface 250 that facilitates communication among the respective devices. The local interface 250 can be, for example, but is not limited to, one or more buses or other wired or wireless connections, as is known in the art. The local interface 250 may have additional elements, which are omitted for simplicity, such as controllers, buffers (caches), drivers, repeaters, and receivers, to enable communications. Further, the local interface 250 may include address, control, and/or data connections to enable appropriate communications among the aforementioned components.

The wireless radio module 220 includes, but is not limited to, a receiver, transmitter, and/or transceiver, among others. The wireless radio module 220 is configured to receive and transmit radio frequency (RF) signals, and convert the received RF signals to digital signals. The baseband module 230 processes the digital signals before transmitting/receiving the processed signals from/to the network infrastructure 100 through the wireless radio module 220.

The coordination between the wireless radio module 220 and the baseband module 230 is maintained by the control module 270. Such control module 270 includes a processor, which is a hardware device for executing software, particularly that stored in memory 214. The processor can be any custom made or commercially available processor, a central processing unit (CPU), an auxiliary processor among several processors associated with the base station 145, 150, 155, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, or a 68xxx series microprocessor from Motorola Corporation.

The network interface 240 enables the base station 145, 150, 155 to communicate with the switch 160 of the network infrastructure 100. The network interface 240 comprises the various components used to transmit and/or receive data over a telecommunication network (not shown), where provided. By way of example, the network interface 240 includes a device that can communicate both inputs and outputs, for instance, a modulator/demodulator (e.g., modem), a radio frequency (RF) device or infrared (IR) transceiver, among others.

The memory 214 can include any one or combination of volatile memory elements 135 (e.g., random access memory (RAM, such as DRAM, SRAM, SDRAM, etc.)) and nonvolatile memory elements (e.g., ROM, hard drive, tape, CDROM, etc.). Moreover, the memory 214 may incorporate electronic, magnetic, optical, and/or other types of storage media. Note that the memory 214 can have a distributed architecture, where various components are situated remote from one another, but can be accessed by the control module 270.

The software in memory 214 may include one or more separate programs, each of which comprises an ordered listing of executable instructions for implementing logical functions. In the example of FIG. 2, the software in the memory 214 includes the distress module 255, the alert module 260 and a suitable operating system (O/S) 222. The distress module 255 is configured, among others, to determine whether the base station has lost electrical connection to the primary power source 204. The alert module 260 is configured, among others, to receive a distress signal from another base station 145, 150, 155 and send an alert signal to a network server via a network switch responsive to receiving the distress signal from the other base station. Operations of the distress module 255 and the alert module 260 are described in relation to FIGS. 3 and 4, respectively.

When the base station 145, 150, 155 is in operation, the control module 270 is configured to execute software stored within the memory 214, to communicate data to and from the memory 214, and to generally control operations of the base station 145, 150, 155 pursuant to the software. The distress module 255, the alert module 260 and the O/S 22, in whole or in part, but typically the latter, are read by the control module 270, perhaps buffered within the control module 270, and then executed.

When the distress module 255 and the alert module 260 are implemented in software, as is shown in FIG. 2, it should be noted that the distress module 255 and the alert module 260 can be stored on any computer readable medium for use by or in connection with any computer related system or method. In the context of this document, a computer readable medium is an electronic, magnetic, optical, or other physical device or means that can contain or store a computer program for use by or in connection with a computer related system or method.

The distress module 255 and the alert module 260 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example, but is not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the distress module 255 and the alert module 260 are implemented in hardware, the distress module 255 and the alert module 260 can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

A nonexhaustive list of examples of suitable commercially available operating systems 222 is as follows: (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., PalmOS available from Palm Computing, Inc., and Windows CE available from Microsoft Corporation). The operating system 222 essentially controls the execution of other computer programs, such as the refresh manager 110, and provides scheduling, input-output control, file and data management, memory management, and communication control and related services.

If the base station 145, 150, 155 is a PC, workstation, or the like, the software in the memory 214 may further include a basic input output system (BIOS) (omitted for simplicity). The BIOS is a set of essential software routines that initialize and test hardware at startup, start the O/S 222, and support the transfer of data among the hardware devices. The BIOS is stored in ROM so that the BIOS can be executed when the base station 145, 150, 155 is activated.

Figure 3:
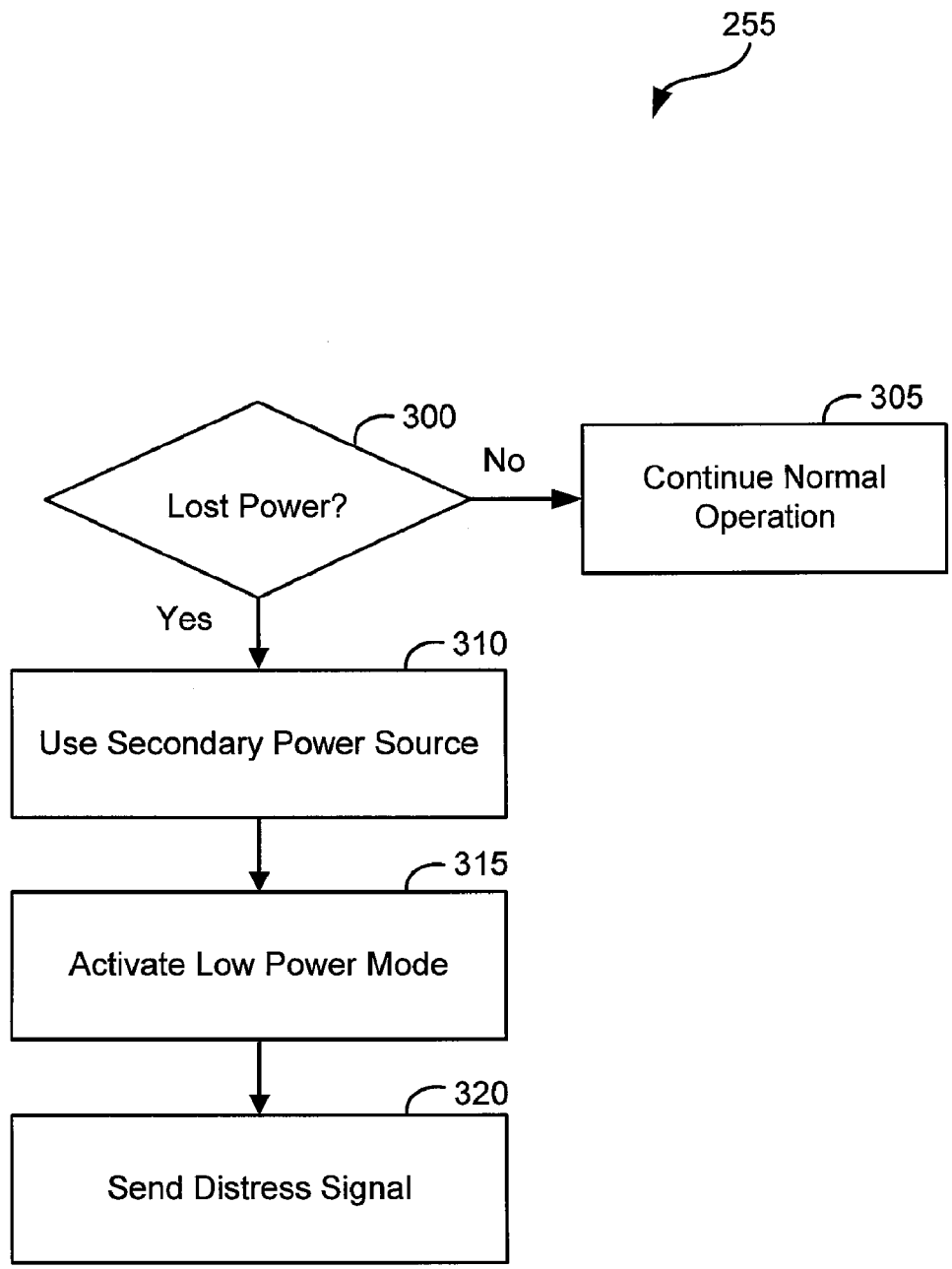
FIG. 3 is a flow diagram that illustrates an embodiment of the architecture, functionality, and/or operation of a distress module, such as that shown in FIG. 2.

FIG. 3 is a flow diagram that illustrates an embodiment of the architecture, functionality, and/or operation of the distress module 255, such as that shown in FIG. 2. Beginning with step 300, the distress module 255 determines whether the wireless base station 145, 150, 155 has lost electric power from the primary power source 204. If the base station 145, 150, 155 maintains electric power from the primary power source 204, then in step 305, the base station 145, 150, 155 continues normal operation using the electric power from the primary power source 204. Alternatively or additionally, the base station 145, 150, 155 recharges a secondary power source 203 (FIG. 2) using the electric power from the primary power source 204 during the normal operation of the base station 145, 150, 155.

If the base station 145, 150, 155 is determined to have lost electric power from the primary power source 204, then in step 310, the distress module 255 is configured to instruct the base station 145, 150, 155 to use a second power source 203, e.g., a backup battery. In step 315, the distress module 255 is further configured to instruct the base station to operate in low power mode that restricts the base station to operate less electrical components than the base station operating in the normal mode. The electrical component that is typically operated in the low power mode includes, but is not limited to, the wireless transmitter and the distress module, among others. The distress module 255, in step 320, is further configured to send a distress signal that includes information associated with the status of the base station where the base station has been disconnected from the primary power source. The distress signal further includes, but is not limited to, information associated with the identification of the base station, and information associated with the physical location of the base station, e.g., the base station is locating in building #1 and room #10, among others.

Figure 4:
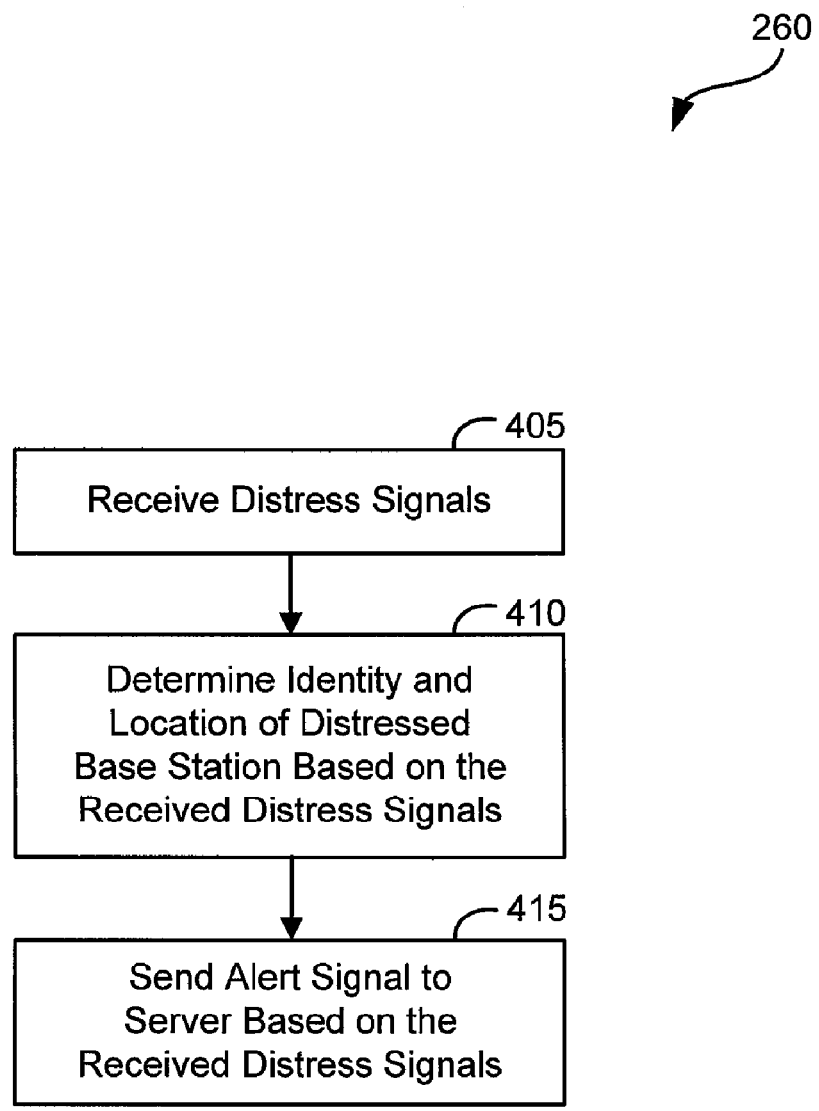
FIG. 4 is a flow diagram that illustrates an embodiment of the architecture, functionality, and/or operation of an alert module, such as that shown in FIG. 2.

FIG. 4 is a flow diagram that illustrates an embodiment of the architecture, functionality, and/or operation of the alert module 260, such as that shown in FIG. 2. Beginning with step 405, the alert module 260 is configured to receive distress signals from another base station 145, 150, 155 that has been disconnected from the primary power source 204. In step 410, the alert module 260 is further configured to determine the identity and location of the distressed base station based on the received distress signals. In step 415, the alert module 260 is further configured to send an alert signal to a server 185 (FIG. 1) within the network infrastructure 100 based on the received distress signals. Alternatively or additionally, the alert signal includes information associated with the identity and location of the distressed base station.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as is suited to the particular use contemplated. All such modifications and variation are within the scope of this disclosure, as determined by the appended claims when interpreted in accordance with the breadth to which they are fairly and legally entitled.

What is claimed:

1. A system for maintaining a base station comprising:
   a base station that is electrically connected to a first power source and configured to receive electric power from the first power source, the base station including:
   a wireless transmitter, and
   a distress module that is configured to:
      determine whether the base station lost the electrical connection to the first power source, and
      responsive to determining that the electrical connection was lost between the first power source and the base station, instruct the wireless transmitter to transmit a distress signal that includes information associated with the status of the base station.

2. The system as defined in claim 1, further comprising a second power source that is electrically connected to the base station, and wherein responsive to determining that the electrical connection between the base station and the first power source was lost, the distress module is configured to instruct the base station to receive electric power from the second power source.

3. The system as defined in claim 2, wherein responsive to determining that the base station received electric power from the first power source, the second power source is configured to recharge using the electric power from the power source.

4. The system as defined in claim 2, wherein the second power source includes a battery.

5. The system as defined in claim 1, wherein responsive to determining that the electrical connection between the base station and the first power source was lost, the distress module is configured to instruct the base station to operate in low power mode that restricts the base station to operate less electrical components than the base station operating in normal mode, the electrical component including at least one of the wireless transmitter and the distress module.

6. The system as defined in claim 1, wherein the base station further includes an alert module that is configured to receive a distress signal from another base station.

7. The system as defined in claim 6, wherein the first power source includes a network switch, the alert module being further configured to send an alert signal to a network server via the network switch responsive to receiving the distress signal from the another base station.

8. The system as defined in claim 1, wherein the first power source includes at least one of a network switch and an electrical outlet.

9. A method for maintaining a base station in a wireless network, the method comprising:
   receiving electric power from a first power source by a base station via an electrical connection;
   determining whether the electrical connection was lost between the first power source and the base station; and
   responsive to determining that the electrical connection was lost between the first power source and the base station, wirelessly transmitting a distress signal that includes information associated with the status of the base station.

10. The method as defined in claim 9, further comprising responsive to determining that the electrical connection between the base station and the first power source was lost, receiving electric power from a second power source.

11. The method as defined in claim 9, further comprising responsive to determining that base station received the electric power from the first power source, recharging a second power source using the electric power from the first power source.

12. The method as defined in claim 9, further comprising responsive to determining that the electrical connection between the base station and the first power source was lost, instructing the base station to operate in low power mode that restricts the base station to operate less electrical components than the base station operating in normal mode, the electrical component including at least one of the wireless transmitter and the distress module.

13. The method as defined in claim 9, further comprising receiving a distress signal from another base station.

14. The method as defined in claim 13, further comprising sending an alert signal to a network server via a network switch responsive to receiving the distress signal from the another base station.

15. The method as defined in claim 13, further comprising determining the identity and location of the distressed base station based on the received distress signal.

16. A base station associated with a wireless network comprising:
   a wireless transmitter;
   a distress module that is configured to:
      determine whether the base station lost the electrical connection to a first power source, and
      responsive to determining that the electrical connection was lost between the first power source and the base station, instruct the wireless transmitter to transmit a distress signal that includes information associated with the status of the base station; and
   a second power source that is electrically connected to the wireless transmitter and the distress module,
   wherein responsive to determining that the electrical connection between the base station and the first power source was lost, the distress module is configured to instruct the base station to receive electric power from the second power source.

17. The base station as defined in claim 16, wherein responsive to determining that the base station received electric power from the first power source, the base station is configured to recharge the second power source using the electric power from the first power source.

18. The base station as defined in claim 16, wherein responsive to determining that the electrical connection between the base station and the first power source was lost, the distress module is configured to instruct the base station to operate in low power mode that restricts the base station to operate less electrical components than the base station operating in normal mode, the electrical component including at least one of the wireless transmitter and the distress module.

19. The base station as defined in claim 16, wherein the base station further includes an alert module that is configured to receive a distress signal from another base station.

20. The base station as defined in claim 19, wherein the first power source includes a network switch, the alert module being further configured to send an alert signal to a network server via the network switch responsive to receiving the distress signal from the another base station.

* * * * *